United States Patent
Yun et al.

(10) Patent No.: US 7,859,728 B2
(45) Date of Patent: Dec. 28, 2010

(54) TWO-SIDE SCANNING APPARATUS AND A METHOD OF CONTROLLING THE SAME

(75) Inventors: Young-jung Yun, Suwon-si (KR); Karp-sik Youn, Hwaseong-gun (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1441 days.

(21) Appl. No.: 11/280,276

(22) Filed: Nov. 17, 2005

(65) Prior Publication Data
US 2006/0114524 A1 Jun. 1, 2006

(30) Foreign Application Priority Data
Nov. 26, 2004 (KR) .................. 10-2004-0098183

(51) Int. Cl.
*H04N 1/04* (2006.01)
(52) U.S. Cl. .................. 358/498; 358/496; 358/474
(58) Field of Classification Search ................. 358/474, 358/498, 496; 399/374, 364; 355/23, 24; 271/205, 902; 347/262, 264
See application file for complete search history.

(56) References Cited

U.S. PATENT DOCUMENTS

| | | | | | |
|---|---|---|---|---|---|
| 5,463,451 | A | * | 10/1995 | Acquaviva et al. | 399/211 |
| 5,784,680 | A | * | 7/1998 | Taruki | 399/374 |
| 6,021,305 | A | * | 2/2000 | Sato et al. | 399/374 |
| 6,209,861 | B1 | * | 4/2001 | Kakuta et al. | 271/3.02 |
| 6,307,614 | B1 | * | 10/2001 | Gaarder et al. | 355/24 |
| 6,393,251 | B2 | * | 5/2002 | Kono | 399/370 |
| 6,434,359 | B2 | * | 8/2002 | Nose et al. | 399/374 |
| 6,522,860 | B2 | * | 2/2003 | Nose et al. | 399/374 |
| 7,450,277 | B2 | * | 11/2008 | Poletto | 358/498 |
| 7,522,871 | B2 | * | 4/2009 | Tu | 399/374 |
| 7,578,504 | B2 | * | 8/2009 | Tsai et al. | 271/301 |
| 2001/0048830 | A1 | | 12/2001 | Nose et al. | |
| 2007/0076270 | A1 | * | 4/2007 | Poletto | 358/498 |

FOREIGN PATENT DOCUMENTS

| | | |
|---|---|---|
| JP | 8-310740 | 11/1996 |
| JP | 10-69129 | 3/1998 |
| JP | 2002-87712 | 3/2002 |
| KR | 1999-54351 | 7/1999 |

OTHER PUBLICATIONS

Chinese Office Action dated Mar. 21, 2008 issued in CN 2005-10113709.3.

* cited by examiner

*Primary Examiner*—Twyler L Haskins
*Assistant Examiner*—Dennis Dicker
(74) *Attorney, Agent, or Firm*—Stanzione & Kim, LLP

(57) ABSTRACT

A two-side scanning apparatus and a method of controlling the two-side scanning apparatus including a sheet feeding roller train installed on a first side of a white roller to transfer a sheet to the white roller and including two rollers contacting each other, a sheet discharging roller train installed on a second side of the white roller opposite the sheet feeding roller train, a sheet reversing path surrounding a circumferential surface of the white roller to receive and guide the sheet being transferred from the sheet discharging roller train back between the white roller and an image sensor, and a sheet guide plate installed between the white roller and the sheet discharging roller train to pivot at a predetermined angle and to guide the sheet toward the sheet reversing path when the sheet is transferred from the sheet discharging roller train toward the white roller.

33 Claims, 9 Drawing Sheets

TWO-SIDE SCANNING APPARATUS AND A METHOD OF CONTROLLING THE SAME

CROSS-REFERENCE TO RELATED APPLICATIONS

This application claims the benefit of Korean Patent Application No. 2004-98183 filed Nov. 26, 2004, in the Korean Intellectual Property Office, the disclosure of which is incorporated herein by reference in its entirety.

BACKGROUND OF THE INVENTION

1. Field of the Invention

The present general inventive concept relates to a scanning apparatus, and more particularly, to a two-side scanning apparatus and a method of controlling the same.

2. Description of the Related Art

In general, a two-side scanning apparatus refers to an apparatus that scans one side of a sheet transferred from a sheet loading tray and then automatically reverses the sheet to scan an opposite side of the sheet. Various conventional types of two-side scanning apparatuses have been developed and used. Japanese Pat. No. 2002-087712 discloses an example of a conventional two-side scanning apparatus. The conventional two-side scanning apparatus disclosed in Japanese Pat. No. 2002-087712 will now be described.

FIG. 1 is a cross-sectional view of the conventional two-side scanning apparatus 1 disclosed in Japanese Pat. No. 2002-087712.

Referring to FIG. 1, the conventional two-side scanning apparatus 1 includes a pickup unit 10, a sheet feeding roller 20, a guide unit 30, a sheet discharging unit 40, and a plurality of sheet reversing paths 51, 52, 53, 54, and 55.

The pickup unit 10 includes a pickup roller 12 and a separator roller 13 and picks up sheets that are loaded into a sheet loading tray 11 one by one. The sheet feeding roller 20 includes a drive sheet feeding roller 21 and a passive sheet feeding roller 22 and transfers a sheet that is picked up by the pickup unit 10.

The guide unit 30 includes a white roller 31 that presses a sheet against a sensing surface to be sensed by an image sensor 3 and transfers the sheet. The guide unit 30 further includes first, second, and third pinch rollers 32, 33, and 34 that contact an outer circumferential surface of the white roller 31 and are driven by the white roller 31.

The sheet discharging unit 40 includes a sheet discharging roller 41, a first pressing roller 42 installed on the sheet discharging roller 41 to contact the sheet discharging roller 41, and a second pressing roller 43 installed beneath the sheet discharging roller 41 to be raised and/or lowered with respect to the sheet discharging roller 41. The second pressing roller 43 is raised and/or lowered by a raising and lowering apparatus (not shown) including a cam. If the second pressing roller 43 is raised, the second pressing roller 43 contacts the sheet discharging roller 41 to rotate along with the sheet discharging roller 41. If the second pressing roller 43 is lowered, the second pressing roller 43 does not rotate along with the sheet discharging roller 41.

The plurality of sheet reversing paths 51, 52, 53, 54, and 55 include a first sheet reversing path 51 formed to guide sheets between the sheet feeding roller 20 and the guide unit 30, a second sheet reversing path 52 formed between the sheet feeding roller 20 and the sheet discharging roller 41 and the first pressing roller 42 of the sheet discharging unit 40, a third sheet reversing path 53 formed between the sheet discharging roller 41 and the first pressing roller 42 of the sheet discharging unit 40 and the guide unit 30, a fourth sheet reversing path 54 formed between the guide unit 30 and the sheet discharging roller 41 and the second pressing roller 43 of the sheet discharging unit 40, and a fifth sheet reversing path 55 formed to connect the third sheet reversing path 53 to the fourth sheet reversing path 54.

Additionally, a first guide plate 61 is installed at an intersection between the first and second sheet reversing paths 51 and 52 to pivot therebetween. A second guide plate 62 is installed at an intersection between the second and third sheet reversing paths 52 and 53 to pivot therebetween. A third guide plate 63 is installed at an intersection between the fourth and fifth sheet reversing paths 54 and 55 to pivot therebetween. One of the first through fifth sheet reversing paths 51 through 55 through which sheets are transferred is selected based on a position of each of the first, second, and third guide plates 61, 62, and 63.

A two-side scanning operation of the conventional two-side scanning apparatus 1 will now be described with reference to FIG. 1.

The sheets picked up by the pickup roller 12 from the sheet loading tray 11 are separated by the separator roller 13 one by one and are then transferred to the sheet feeding roller 20. Here, the first, second, and third guide plates 61, 62, and 63 are positioned toward upper positions B, D, and F, respectively. Thus, the sheet transferred by the sheet feeding roller 20 is transferred between the first pressing roller 42 and the sheet discharging roller 41 along the second sheet reversing path 52. Since the sheet discharging roller 41 rotates in a forward direction (i.e., clockwise), the sheet that is disposed between the first pressing roller 42 and the sheet discharging roller 41 is discharged above the sheet discharging tray 44.

If a rear end of the sheet is determined to be positioned between the first pressing roller 42 and the sheet discharging roller 41, the sheet discharging roller 41 stops rotating in the forward direction. Here, the second guide plate 62 is lowered to position C to intersect the second sheet reversing path 52. In this state, the sheet discharging roller 41 rotates in a reverse direction (i.e., counterclockwise) to transfer the sheet to the guide unit 30 through the first sheet reversing path 53. The sheet transferred to the guide unit 30 is guided to the sensing surface to be sensed by the image sensor 3 via the white roller 31 and the first and second pinch rollers 32 and 33. The image sensor 3 then scans one side of the sheet positioned thereon. The scanned sheet is then transferred between the sheet discharging roller 41 and the second pressing roller 43 through the fourth sheet reversing path 54. Since the sheet discharging roller 41 rotates in the reverse direction, the sheet that is disposed between the sheet discharging roller 41 and the second pressing roller 43 is discharged to the sheet discharging tray 44.

When the rear end of the sheet is positioned between the sheet discharging roller 41 and the second pressing roller 43, the sheet discharging roller 41 stops rotating in the reverse direction. Here, the third guide plate 63 is lowered into position E to intersect the fourth sheet reversing path 54. When the sheet discharging roller 41 rotates in the forward direction in this state, the sheet is transferred through the fifth and third sheet reversing paths 55 and 53 to the guide unit 30. When the sheet enters the guide unit 30, the second pressing roller 43 is lowered and is separated from the sheet discharging roller 41. The sheet transferred to the guide unit 30 is then guided to the sensing surface to be sensed by the image sensor 3 via the white roller 31 and the first and second pinch rollers 32 and 33 such that a side of the sheet opposite to the side of the sheet scanned in the previous process faces the image sensor 3. The image sensor 3 then scans the opposite side of the sheet. The sheet, which is completely scanned, is then transferred between the second pressing roller 43 and the sheet discharging roller 41 through the fourth sheet reversing path 54. Here, since the second pressing roller 43 is in a lowered state (i.e., separated from the sheet discharge roller 41), a portion of the sheet protrudes above the sheet discharging tray 44 without contacting the second pressing roller 43. Once the sheet is transferred a predetermined distance, the second pressing roller 43 is raised and the sheet discharging roller 41 rotates in the reverse direction to completely discharge the sheet onto the sheet discharging tray 44.

When two or more sheets are sequentially scanned, both sides of a first sheet are completely scanned, and then the first sheet stops between the second pressing roller 43 and the sheet discharging roller 41. In this state, a second sheet starts to be fed from the sheet load tray 11. In other words, when the first sheet is positioned between the second pressing roller 43 and the sheet discharging roller 41, the pickup unit 10 and the sheet feeding roller 20 operate such that the second sheet is transferred toward the second sheet reversing path 52. Simultaneously, the sheet discharging roller 41 rotates in the forward direction to transfer the first sheet to the guide unit 30 through the fifth and third sheet reversing paths 55 and 53. When a rear end of the second sheet is positioned between the first pressing roller 42 and the sheet discharging roller 41 and a front end of the first sheet goes into the guide unit 30, the second pressing roller 43 is lowered and is separated from the sheet discharge roller 41. When a rear side of the first sheet is completely scanned in this state, the sheet discharging roller 41 rotates in the reverse direction and the second pressing roller 43 is raised. The first sheet, which is completely scanned, is then discharged to the sheet discharging tray 44, and the second sheet is transferred to the guide unit 30 to perform scanning on both sides thereof.

In the conventional two-side scanning apparatus 1 described above, the first through fifth sheet reversing paths 51 through 55 and the first through third guide plates 61 through 63 are installed to guide the transfer of sheets to reverse the sheets for scanning both sides thereof. Additionally, an apparatus to raise and lower the second pressing roller 43 of the discharging unit 40 is required. Thus, the conventional two-side scanning apparatus 1 has a complicated structure. In addition, a plurality of sensors are required to determine positions of the sheets along the first through fifth sheet reversing paths 51 through 55. Thus, a large amount of cost is required to perform a two-side scanning function in the conventional two side scanning apparatus. Additionally, a large installation space is required. As a result, the conventional two-side scanning apparatus 1 is typically large and/or bulky.

SUMMARY OF THE INVENTION

The present general inventive concept provides a two-side scanning apparatus including a simplified sheet reversing structure having a single sheet path and a single guide plate usable to perform two-side scanning. The present general inventive concept also provides a two-side scanning apparatus having reduced fabricating cost and a compact size and a method of controlling the two-side scanning apparatus.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a two-side scanning apparatus including: a white roller installed on an image sensor, a sheet feeding roller train installed on a first side of the white roller to transfer a sheet to the white roller and including two rollers contacting each other, a sheet discharging roller train installed on a second side of the white roller opposite the sheet feeding roller then and including three rollers in constant contact with one another, a sheet reversing path surrounding a circumferential surface of the white roller to receive and guide the sheet being transferred from the sheet discharging roller train back between the white roller and the image sensor, and a sheet guide plate installed between the white roller and the sheet discharging roller train to pivot at a predetermined angle and to guide the sheet toward the sheet reversing path when the sheet is transferred from the sheet discharging roller train toward the white roller.

The sheet guide plate may pivot with a rotation of the sheet discharging roller train.

The sheet discharging roller train may include: a sheet discharging roller to rotate in forward and reverse directions, and first and second passive rollers installed on and beneath the sheet discharging roller to contact a circumferential surface of the sheet discharging roller and to be passively rotated by the sheet discharging roller. When the sheet discharging roller rotates in the reverse direction, the sheet guide plate may pivot into a predetermined position to guide the sheet positioned between the sheet discharging roller and the first passive roller to the sheet reversing path.

The two-side scanning apparatus may further include: a first sheet sensor installed between the sheet discharging roller train and the sheet guide plate to sense the sheet, and a second sheet sensor installed between the sheet feeding roller and the white roller to sense the sheet.

The two-side scanning apparatus may further include a plurality of pinch rollers installed along the sheet reversing path to contact the circumferential surface of the white roller.

The foregoing and/or other aspects of the present general inventive concept are also achieved by providing a method of controlling a two-side scanning apparatus, including: rotating a drive sheet feeding roller, scanning a rear side of a sheet transferred by the drive sheet feeding roller using an image sensor, rotating a sheet discharging roller, stopping the sheet discharging roller when a rear end of the sheet having the rear side thereof completely scanned is positioned between the sheet discharging roller and a first passive roller, pivoting a sheet guide plate upward, rotating the sheet discharging roller in a reverse direction such that the sheet is guided along the sheet guide plate into a sheet reversing path, and scanning a front side of the sheet using the image sensor.

When a first sheet sensor senses a front end of the sheet, the sheet discharging roller may be rotated.

When the first sheet sensor senses a rear end of the sheet, the sheet discharging roller may be stopped from rotating.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
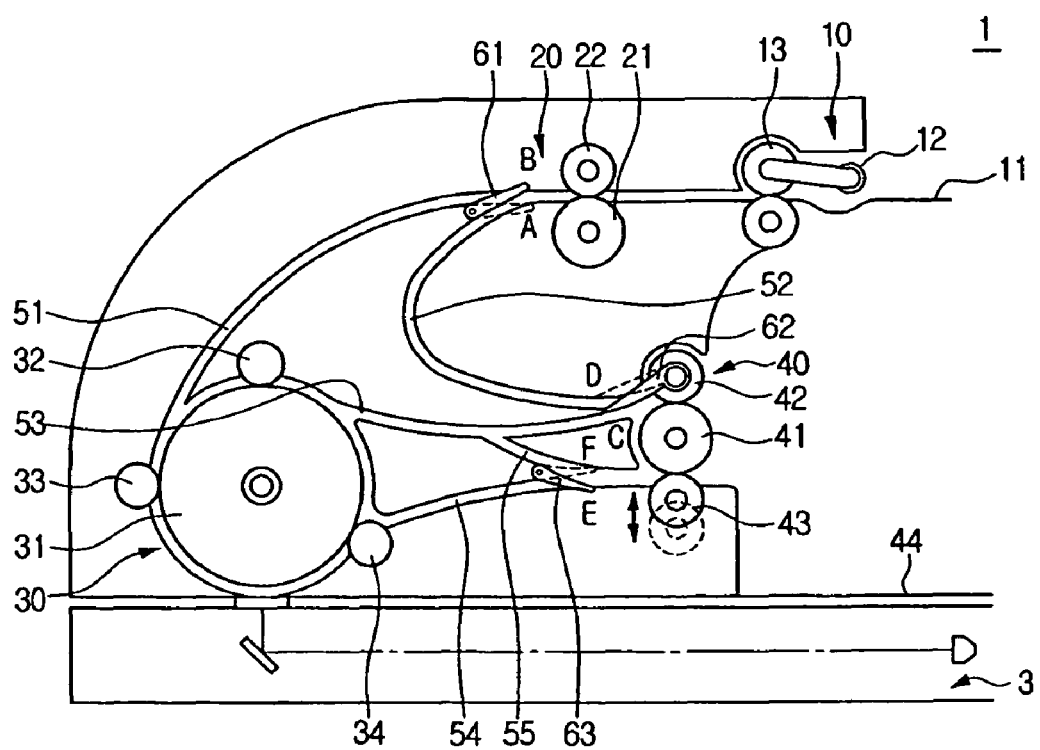
FIG. 1 is a cross-sectional view of a conventional two-side scanning apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
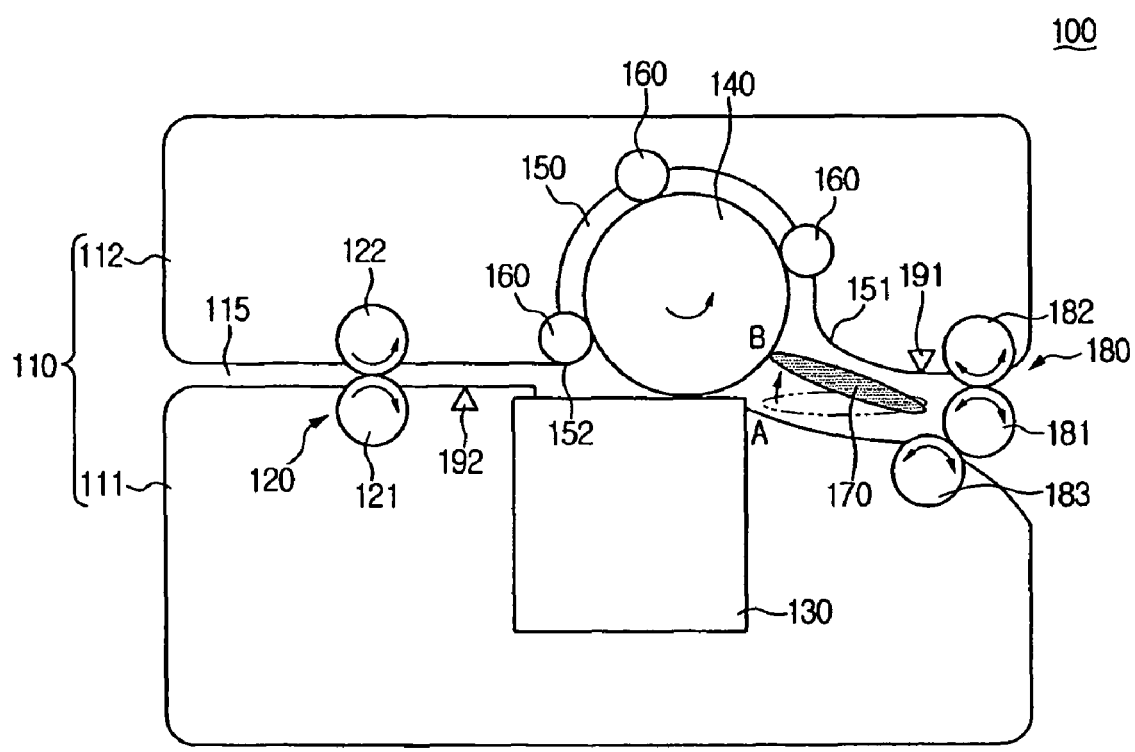
FIG. 2 is a schematic cross-sectional view of a two-side scanning apparatus according to an embodiment of the present general inventive concept.
Figure 3:
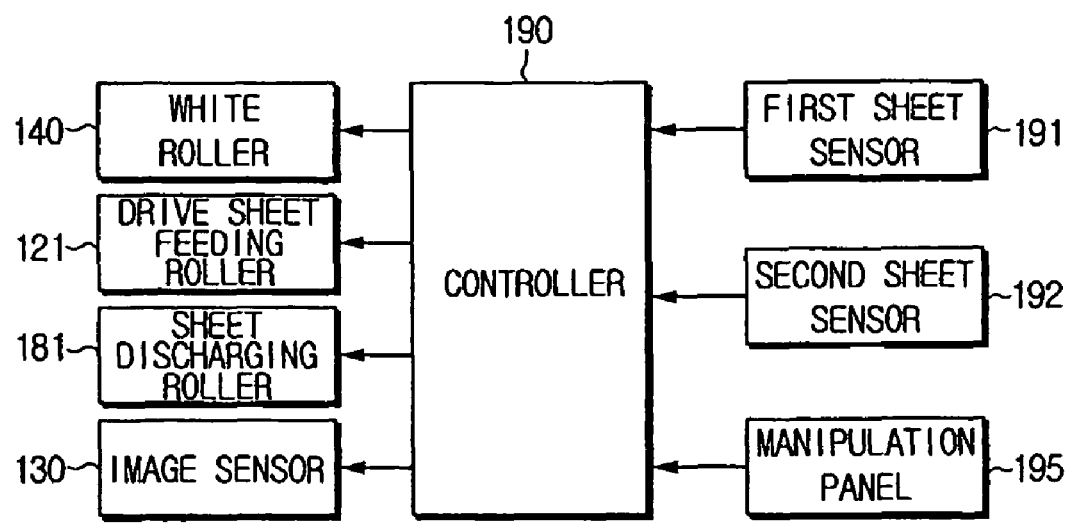
FIG. 3 is a block diagram illustrating the two-side scanning apparatus of FIG. 3.

Referring to FIGS. 2 and 3, a two-side scanning apparatus 100 according to an embodiment of the present general inventive concept includes a frame 110, a sheet feeding roller train 120, an image sensor 130, a white roller 140, a sheet reversing path 150, a sheet guide plate 170, a sheet discharging roller train 180, and a controller 190.

The frame 110 includes upper and lower frames 112 and 111. A lower surface of the upper frame 112 and an upper surface of the lower frame 111 form a sheet transfer path 115.

The sheet feeding roller train 120 includes a drive sheet feeding roller 121 and a passive feeding roller 122 that rotate in contact with each other. The sheet feeding roller train 120 is installed at the sheet transfer path 115 in front of the image sensor 130 (i.e., to the left of the image sensor 130 as illustrated in FIG. 2) to transfer sheets, which are fed into the sheet transfer path 115 one by one via a pickup unit (not shown), to the image sensor 130. Although not shown, a sheet loading tray into which a plurality of sheets can be loaded and picked up one by one can be installed in front of the sheet feeding roller train 120 adjacent to where the sheet transfer path 115 begins.

The image sensor 130 is installed at the lower frame 111 and scans a contacting side of a sheet that is transferred between the image sensor 130 and the white roller 140 through the sheet transfer path 115.

The white roller 140 is mounted on the upper frame 112 at a position that corresponds to the image sensor 130 such that the sheet that is transferred tightly contacts an upper surface of the image sensor 130. The white roller 140 also rotates in one direction (i.e., counterclockwise as illustrated in FIG. 2) to transfer sheets passing along the upper surface of the image sensor 130 toward the sheet discharging roller train 180. Although FIG. 2 (and other FIGS.) illustrates that the white roller 140 is disposed in the upper frame 112 and the image sensor 130 is disposed in the lower frame 111, it should be understood that other arrangements of the white roller 140 and the image sensor 130 may be used by embodiments of the present general inventive concept. For example, the white roller 140 may be disposed in the lower frame 111 and the image sensor 130 may be disposed in the upper frame 112.

The sheet reversing path 150 is formed at the upper frame 112 to enclose a portion of an outer circumferential surface of the white roller 140. A starting end 151 of the sheet reversing path 150 is formed such that a rear end of a sheet being transferred in reverse by reverse rotation of the sheet discharging roller 181 is smoothly guided by the sheet guide plate 170, which is pivoted upward (to position B), to the sheet reversing path 150. A gap between the outer circumferential surface of the white roller 140 and the upper frame 112 forming the sheet reversing path 150 is determined such that the rear end of the sheet that is transferred in reverse by the reverse rotation of the sheet discharging roller 181 turns along the sheet reversing path 150 to be transferred to a front side of the white roller 140 (i.e., to the left of the white roller 140 as illustrated in FIG. 2). Here, an end 152 of the sheet reversing path 150 is formed such that the rear end of the sheet that is transferred goes back between the white roller 140 and the image sensor 130 toward the discharge roller train 180.

A plurality of pinch rollers 160 may be installed at various points along the sheet reversing path 150 to smoothly transfer the sheet being transferred in reverse. The pinch rollers 160 contact the outer circumferential surface of the white roller 140 to rotate along with the rotation of the white roller 140. Thus, the sheet that is transferred in reverse by the sheet discharging roller 181 and the sheet guide plate 170 is smoothly transferred along the sheet reversing path 150 due to the rotation of the white roller 140 and the pinch rollers 160. The plurality of pinch rollers 160 may include only one pinch roller or may include three pinch rollers as illustrated in FIG. 2. Other numbers of pinch rollers may also be used. One pinch roller 160 may be installed at the end 152 of the sheet reversing path 150 such that the rear end of the sheet that is being transferred out of the sheet reversing path 150 is accurately transferred back between the white roller 140 and the image sensor 130 along the white roller 140.

The sheet guide plate 170 is installed at a transfer path formed between the white roller 140 and the sheet discharging roller train 180. A first end of the sheet guide plate 170 is pivotable by a predetermined angle. In other words, as illustrated in FIG. 2, a second end of the sheet guide plate 170 positioned closer to the sheet discharging roller 181 is hinged, and the first end of the sheet guide plate 170 that is positioned closer to the white roller 140 is pivotable by a predetermined angle. When the sheet guide plate 170 is pivoted downward to be in position A, a sheet that passes over the image sensor 130 is transferred between the sheet discharging roller 181 and a first passive roller 182. When the guide plate 170 is pivoted upward to position B, the sheet that passes over the image sensor 130 is transferred between the sheet discharging roller 181 and a second passive roller 183, and a sheet that is transferred in reverse by the sheet discharging roller 181 and the first passive roller 182 is guided to the sheet reversing path 150. A driving force to pivot the sheet guide plate 170 upward may be supplied using an additional drive source. However, when the sheet discharging roller 181 rotates in reverse, the sheet guide plate 170 may be pivoted upward together with the sheet discharging roller 181.

The sheet discharging roller train 180 that is installed at the end of the sheet transfer path 115 includes the sheet discharging roller 181, the first passive roller 182, and the second passive roller 183 that rotate in a train in constant contact with one another. Here, the sheet discharging roller 181 receives a driving force to rotate, the first passive roller 182 is installed on the sheet discharging roller 181 in contact with the sheet discharging roller 181 to rotate along with the sheet discharging roller 181, and the second passive roller 182 is installed beneath the sheet discharging roller 181 in contact with the sheet discharging roller 181 to rotate along with the sheet discharging roller 181. Although not shown, a sheet discharging tray into which sheets that are discharged from the sheet discharging roller train 180 are loaded may be installed in the rear of the sheet discharging roller train 180 (i.e., to the right of the sheet discharging roller train 180 as illustrated in FIG. 2).

First and second sheet sensors 191 and 192 may be installed to sense positions of sheets along the sheet transfer path 115. The first sheet sensor 191 may be installed between the sheet guide plate 170 and the sheet discharging roller train 180, and the second sheet sensor 192 may be installed between the sheet feeding roller train 120 and the white roller 140. The first sheet sensor 191 may be installed at the upper frame 112 to sense a sheet being transferred between the sheet discharging roller 181 and the first passive roller 182. The sheet sensors 191 and 192 may be disposed in other locations along the sheet transfer path 115 that achieve the intended purposes described herein.

One or more drive sources and a power transmitting unit (not shown) to drive the drive sheet feeding roller 121, the white roller 140, and the sheet discharging roller 181 are installed at the frame 110 to rotate the drive sheet feeding roller 121, the white roller 140, and the sheet discharging roller 181. A drive source for the drive sheet feeding roller 121 and the white roller 140 can include a motor to rotate in one direction, and a drive source for the sheet discharging roller 181 can include a motor to rotate in both directions. The power transmitting unit to transfer power from the motors to the drive sheet feeding roller 121, the white roller 140, and the sheet discharging roller 181 may be a general power transmitting structure.

As illustrated in FIG. 3, the controller 190 controls the elements of the two-side scanning apparatus to perform a two-side or a one-side scanning operation according to a signal input from a manipulation panel 195. The manipulation panel 195 may comprise any input device that enables a scanning operation to be selected and/or requested. In other words, the controller 190 determines whether the two-side or one-side scanning operation is requested according to the input signal. If the controller 190 determines that the two-side scanning operation is requested, the controller 190 controls the sheet discharging roller 181 to rotate in the forward or the reverse direction and the sheet guide plate 170 to selectively pivot into positions A and/or B according to a sheet sensing signal output from the first sheet sensor 191. Additionally, the controller 190 controls the image sensor 130 to turn on and/or off according to the sheet sensing signals output from the first and second sheet sensors 191 and 192.

Figure 8:
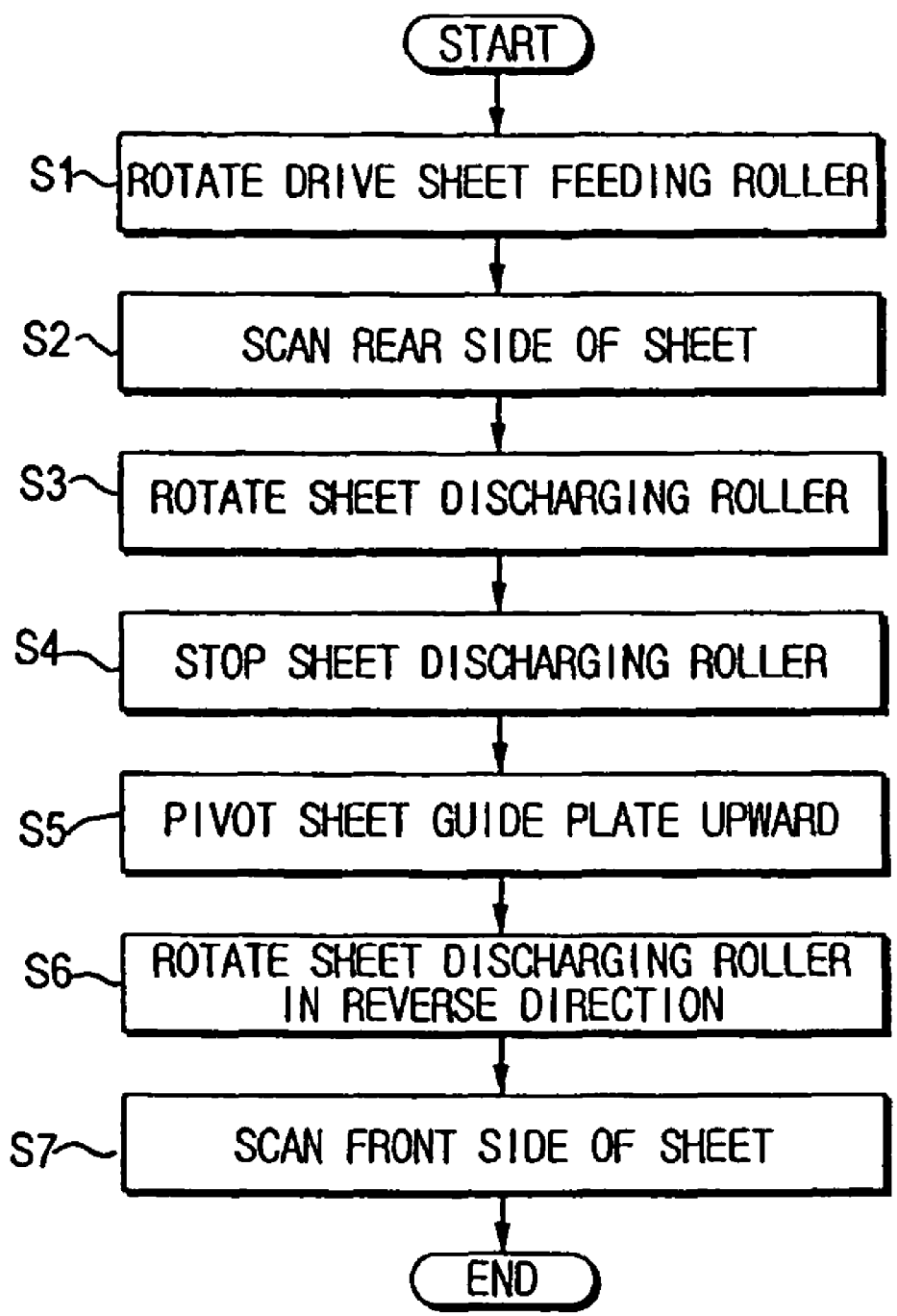
FIG. 8 is a schematic flowchart illustrating a method of controlling a two-side scanning apparatus according to an embodiment of the present general inventive concept.
Figure 9:
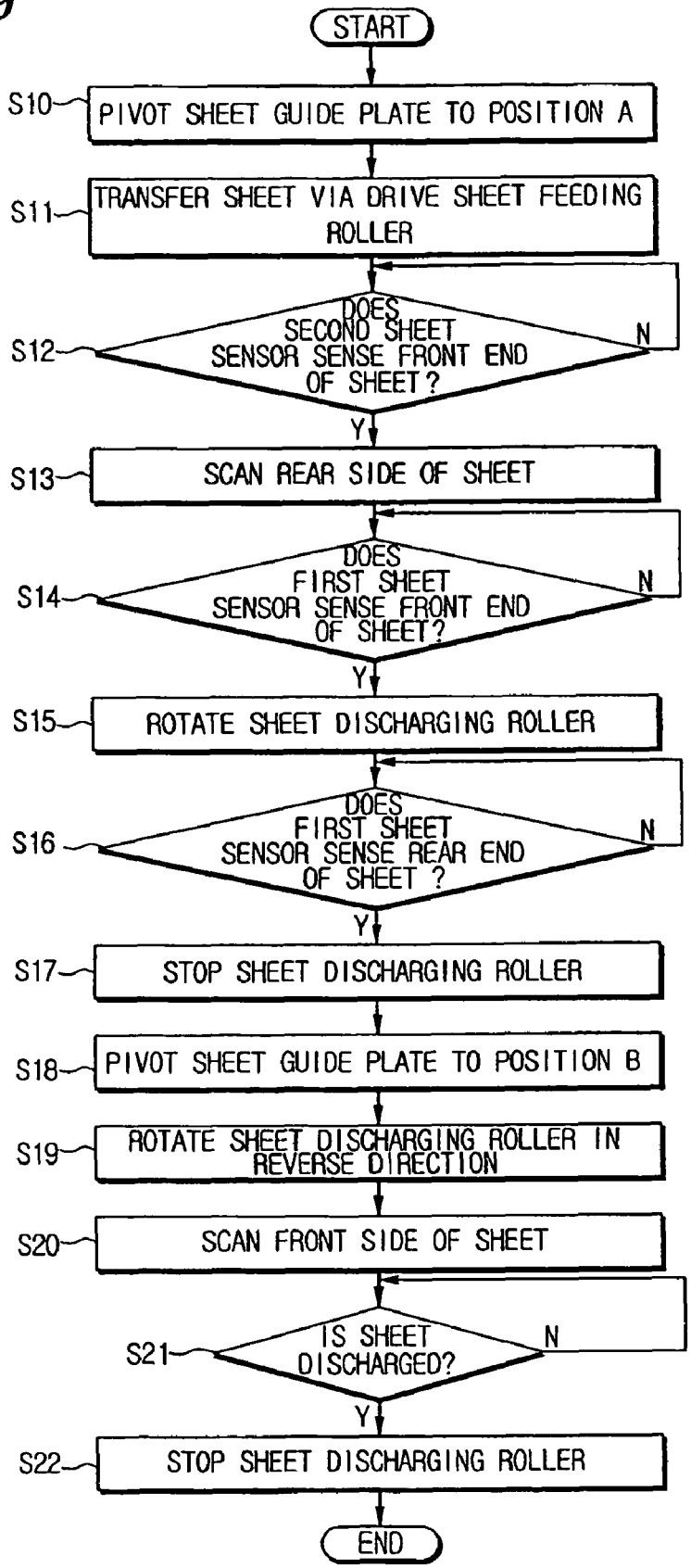
FIG. 9 is a detailed flowchart illustrating a method of controlling the two-side scanning apparatus according to another embodiment of the present general inventive concept.

The operation of the two-side scanning apparatus 100 having the above-described structure will now be described with reference to FIGS. 3 through 9. FIGS. 4 through 7 are views illustrating operations of the two-side scanning apparatus 100. FIG. 8 is a schematic flowchart illustrating a method of controlling the a two-side scanning apparatus according to an embodiment of the present general inventive concept, and FIG. 9 is a detailed flowchart illustrating a method of controlling a two-side scanning apparatus according to another embodiment of the present general inventive concept. In some embodiments, the methods of FIGS. 8 and/or 9 can be performed by the two-side scanning apparatus 100 of FIG. 2. Thus, the methods of FIGS. 8 and 9 will be described with reference to FIGS. 2 through 7.

Referring to FIG. 8, the two side scanning apparatus 100 rotates the drive sheet feed roller 121 to transfer a sheet to the white roller 140 in operation S1. A rear side of the sheet is scanned as the sheet passes between the white roller 140 and the image sensor 130 in operation S2. The sheet discharge roller 181 is rotated to transfer the sheet having the scanned rear side away from the image sensor 130 in operation S3. In operation S4, the sheet discharge roller 181 is stopped from rotating when a rear end of the sheet is received. The sheet guide plate 170 is then pivoted upward into the position B in operation S5. In operation S6 the sheet discharge roller 181 is then rotated in the reverse direction to transfer the sheet back toward the white roller 140. In the operation S6, the sheet is guided upward by the sheet guide plate 170 into the sheet reversing path 150 such that a rear end of the sheet, which is now a leading end of the sheet, is transferred back around the white roller 140 toward the image sensor 130. The front side of the sheet is then scanned by the image sensor 130 in operation S7, and the sheet is transferred again toward the sheet discharge roller 181 by the white roller 140 to be discharged out of the two-side scanning apparatus 100.

Figure 4:
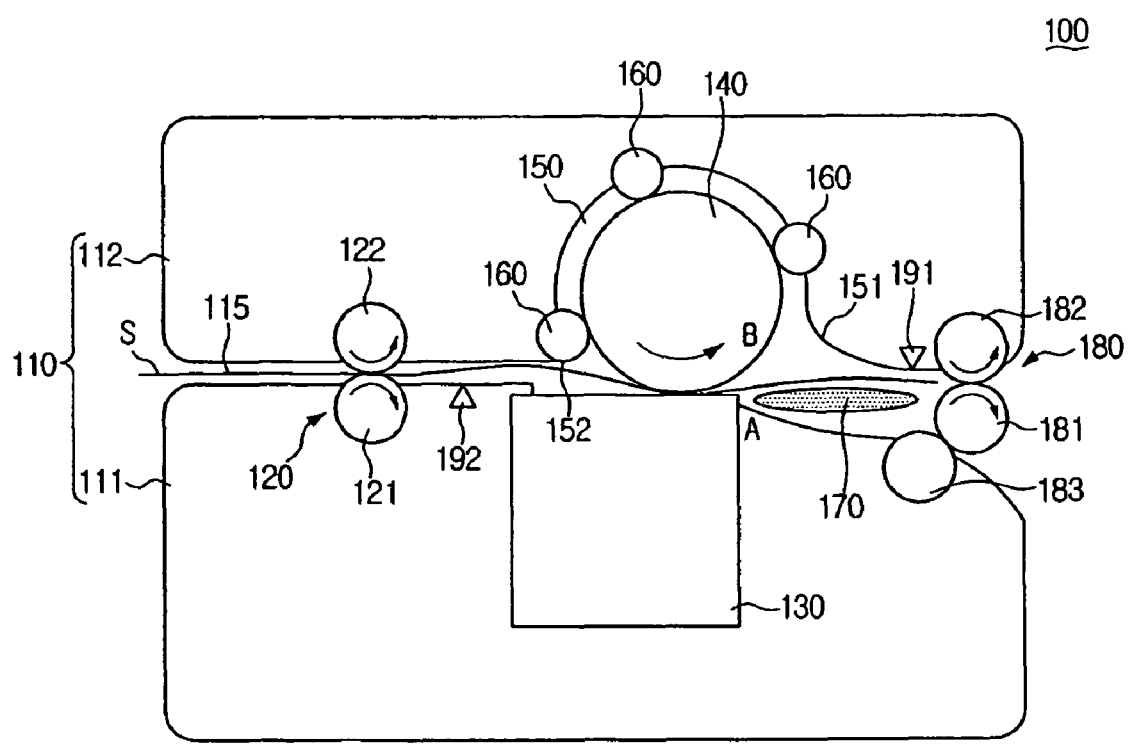
FIGS. 4 through 7 are views illustrating a process of scanning a sheet using the two-side scanning apparatus of FIG. 3.

As illustrated in FIG. 9, when a user desires to scan one side of a sheet S, the user loads the sheet S into the sheet loading tray (not shown) such that the side of the sheet S that the user desires to scan faces downward. Additionally, the user may select the one-side scanning operation on the manipulation panel 195 and may press a scanning start button (not shown). In operation S10, the sheet guide plate 170 is pivoted downward to be in the position A, and the pickup unit picks up one or more sheets one by one to transfer the sheet S to the sheet feeding roller train 120 through the sheet transfer path 115. In operation S11, as illustrated in FIG. 4, the sheet S that is transferred to the sheet feeding roller train 120 is then transferred to the white roller 140 via the drive sheet feeding roller 121 and the passive sheet feeding roller 122. If a front end of the sheet S is transferred between the white roller 140 and the image sensor 130, in operation S13, the image sensor 130 operates to scan the sheet S. Here, if the second sheet sensor 192 is installed in front of the white roller 140, in operation S12, the controller 190 controls the image sensor 130 to turn on and/or off using a sensing signal output from the second sheet sensor 192 indicating whether the front end of the sheet S is sensed. Additionally, since the white roller 140 rotates counterclockwise in contact with the image sensor 130, the sheet S having the one side scanned by the image sensor 130 is transferred toward the sheet discharging roller train 180. When a rear end of the sheet S is transferred away from the image sensor 130, the image sensor 130 ends scanning of the sheet S.

As illustrated in FIG. 4, the front end of the sheet S that is transferred by the white roller 140 passes on the sheet guide plate 170, which is in the position A, and is then transferred between the sheet discharging roller 181 and the first passive roller 182. In operation S14, a determination is made as to whether the first sheet sensor 191 senses the front end of the sheet S being transferred. If it is determined in operation S14 that the first sheet sensor 191 senses the front end of the sheet S, the first sheet sensor 191 transmits a corresponding signal to the controller 190. In operation S15, the controller 190 rotates the sheet discharging roller 181 clockwise (i.e., in the forward direction) to discharge the sheet S to the sheet discharging tray. If the first sheet sensor 191 senses the rear end of the sheet S being transferred and then transmits a corresponding signal to the controller 190, the controller 190 rotates the sheet discharging roller 181 for a predetermined period of time until the sheet S is completely discharged to the sheet discharging tray and then stops the rotation of the sheet discharging roller 181 in the forward direction.

If the user desires to scan both sides of the sheet S, the user can select the two-side scanning operation on the manipulation panel 195 and can press the scanning start button. The pickup unit picks up the sheet S loaded into the sheet loading tray to transfer the sheet S to the sheet feeding roller train 120. After the rear side of the sheet S that is transferred by the rotation of the drive sheet feeding roller 121 is scanned by the image sensor 130 through operations S11 through S15, the sheet S is transferred between the first passive roller 182 and the sheet discharging roller 181 of the sheet discharging roller train 180. If it is determined in operation S14 that the first sheet sensor 191 senses the front end of the sheet S and then transmits the corresponding signal to the controller 190, in operation S15, the controller 190 rotates the sheet discharging roller 181 in the forward direction.

Figure 5:
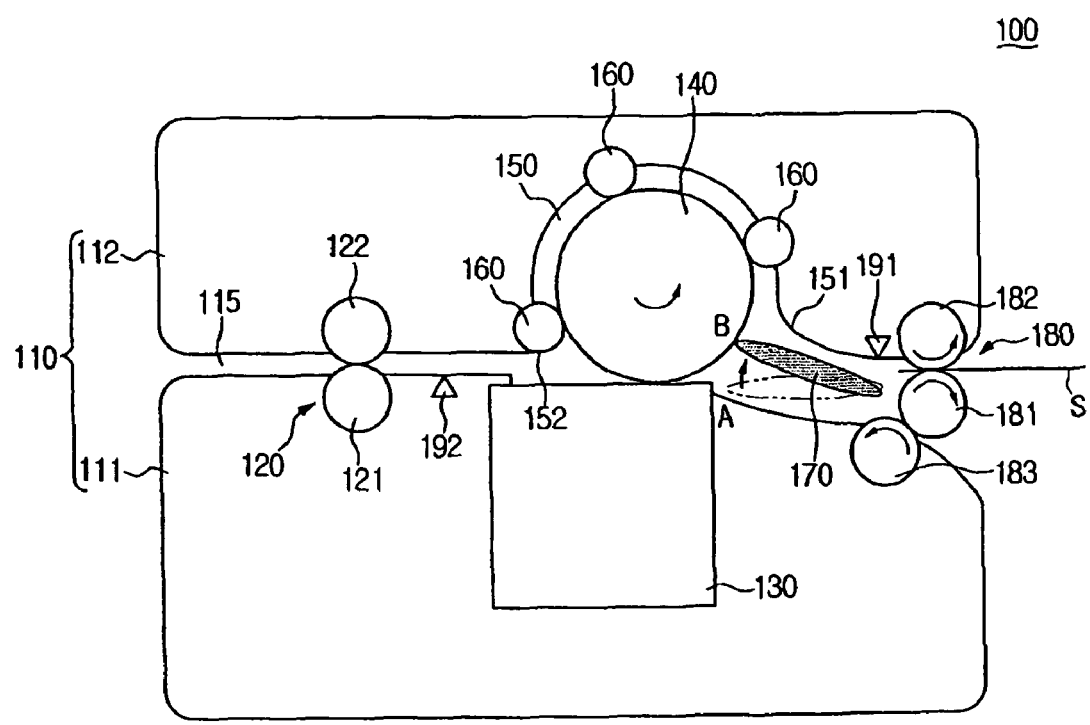

When the sheet discharging roller 181 rotates in the forward direction, the sheet S being transferred starts to be discharged to the sheet discharging tray. If the first sheet sensor 191 senses the rear end of the sheet S being transferred and transmits the corresponding signal to the controller 190 in operation S16, the controller 190 stops the sheet discharging roller 181 in operation S17. Here, after receiving a sheet sensing signal, the controller 190 stops the sheet discharging roller 181 after a predetermined time while accounting for a gap between the first sheet sensor 191 and the sheet discharging roller 181 and a transfer speed of the sheet S. As illustrated in FIG. 5, once the rear end of the sheet S is positioned between the sheet discharging roller 181 and the first passive roller 182, the sheet S stops being transferred by the discharge roller 181.

Figure 6:
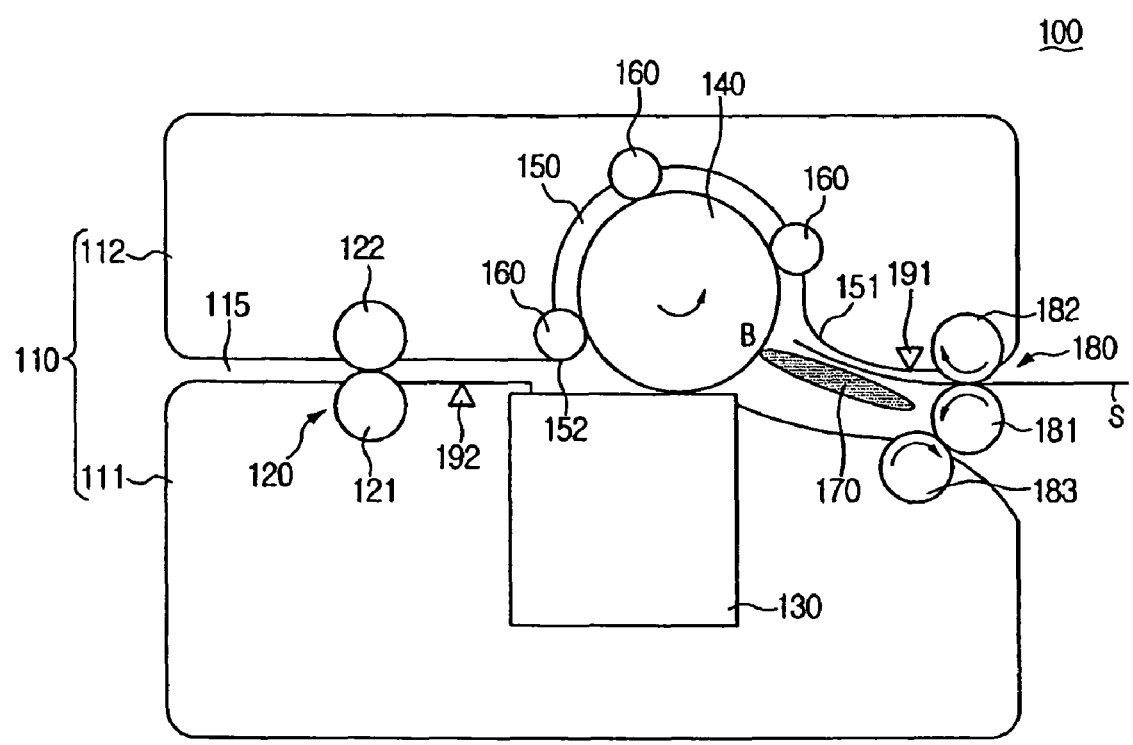

Once the sheet discharging roller 181 stops rotating in the forward direction, in operation S18, the controller 190 controls the sheet guide plate 170 to pivot upward such that the sheet guide plate 170 is in the position B. In operation S19, the controller 190 then controls the sheet discharging roller 181 to rotate counterclockwise (i.e., in the reverse direction). When the sheet guide plate 170 is installed such that the sheet guide plate 170 pivots upward together with the sheet discharging roller 181 due to the reverse rotation of the sheet discharging roller 181, the controller 190 directly rotates the sheet discharging roller 181 in the reverse direction to pivot the sheet guide plate 170 into the position B. It should be understood that in operation S19, when the discharging roller 181 rotates in the reverse direction, the rear end of the sheet S is transferred ahead of the front end of the sheet S. The sheet guide plate 170 pivots upward to move to the position B. As illustrated in FIG. 6, when the sheet discharging roller 181 rotates in the reverse direction, the sheet S that is positioned between the sheet discharging roller 181 and the first passive roller 182 is transferred in the reverse direction toward the sheet reversing path 150 along an upper surface of the sheet guide plate 170.

Figure 7:
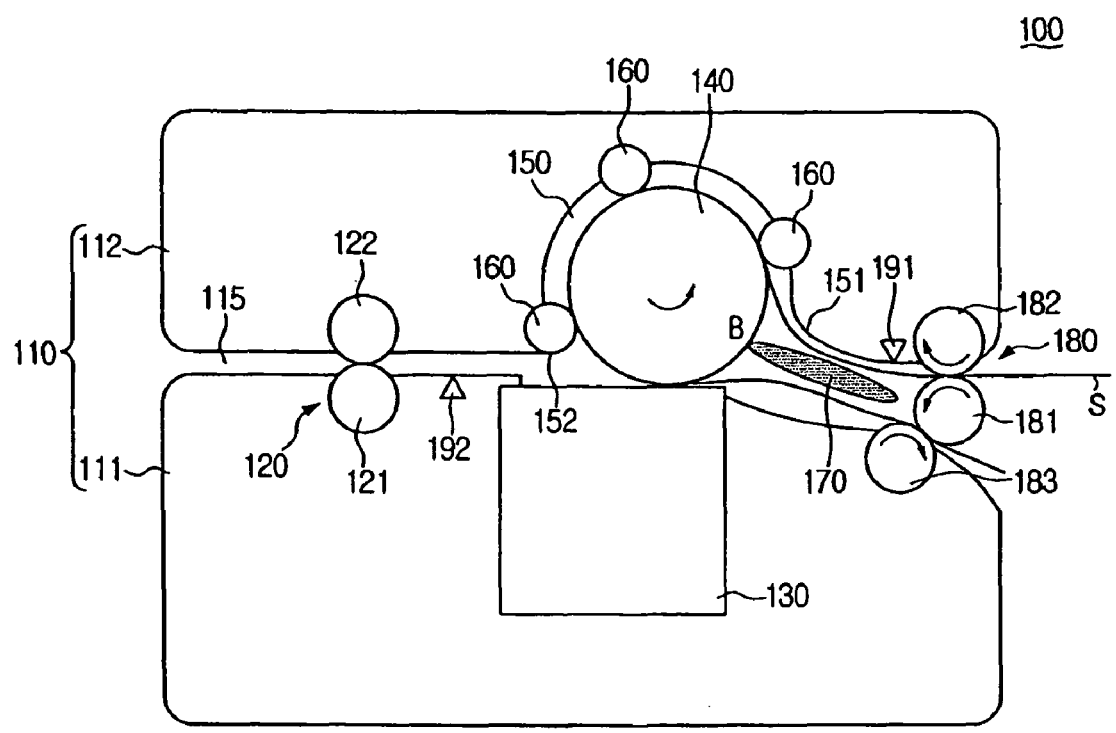

As illustrated in FIG. 7, as the sheet S that is transferred toward the sheet reversing path 150 rotates along the white roller 140 via the plurality of pinch rollers 160 installed along the sheet reversing path 150. The rear end of the sheet S is transferred from the front of the white roller 140 (i.e., from the left side of the white roller 140 as illustrated in FIG. 7) to a position between the white roller 140 and the image sensor 130.

Here, an upper side (i.e., the side that is not yet scanned) of the sheet S faces downward, and a lower side of the sheet S (i.e., the side already scanned) faces upward. Thus, the upper side of the sheet S that is not yet scanned faces downward. If the upper side of the sheet S is positioned above the image sensor 130, in operation S20, the image sensor 130 starts to scan the upper side of the sheet S. The sheet S is transferred toward the sheet discharging roller 180 by the rotation of the white roller 140, and the image sensor 130 continuously scans the upper side of the sheet S. Once the rear end of the sheet S passes between the white roller 140 and the image sensor 130, the rear end of the sheet S is further guided to a lower surface of the sheet guide plate 170 to pass between the sheet discharging roller 181 and the second passive roller 183. Here, since the sheet discharging roller 181 rotates in the reverse direction, the sheet S that is transferred between the sheet discharging roller 181 and the second passive roller 183 is discharged to the sheet discharging tray. As illustrated in FIG. 7, when the white roller 140 and the sheet discharging roller train 180 are installed close together, the rear end of the sheet S is transferred between the sheet discharging roller 181 and the second passive roller 183 while the front end of the sheet S is continuously transferred between the sheet discharging roller 181 and the first passive roller 182. However, even in this case, the first and second passive rollers 182 and 183 rotate in the same direction. Thus, the sheet S is smoothly transferred toward the sheet reversing path 150 and is simultaneously discharged to the sheet discharging tray.

When the front end of the sheet S is transferred away from the image sensor 130, the image sensor 130 stops scanning the sheet S, and the sheet discharging roller 181 continuously rotates in the reverse direction to discharge the sheet S on which two-side scanning is completed to the sheet discharging tray. If the sheet S is discharged to the sheet discharging tray in operation S21, the controller 190 stops the sheet discharging roller 181 in operation S22. Here, the controller 190 can sense the front and rear ends of the sheet S via the first sheet sensor 191 to detect when the rear end of the sheet S passes over the image sensor 130 and when the front end of the sheet S passes away from the image sensor 130. Thus, the controller 190 can control the operations of the image sensor 130 and the sheet discharging roller 181.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A two-side scanning apparatus, comprising:
   a white roller installed on an image sensor;
   a sheet transfer path extending from both sides of a contacting portion between the white roller and the image sensor;
   a sheet feeding roller train installed on a first side of the white roller in the sheet transfer path to transfer a sheet to the white roller and comprising two rollers contacting each other;
   a sheet discharging roller train installed on a second side of the white roller in the sheet transfer path and comprising a sheet discharging roller, and first and second passive rollers installed on and beneath the sheet discharging roller to contact a circumferential surface of the sheet discharging roller;
   a sheet reversing path surrounding a portion of a circumferential surface of the white roller to receive and guide the sheet being transferred from the sheet discharging roller train back between the white roller and the image sensor; and
   a sheet guide plate installed in the sheet transfer path between the white roller and the sheet discharging roller train to pivot at a predetermined angle, the sheet guide plate including an upper surface that guides the sheet to a position between the sheet discharging roller and the first passive roller and a lower surface that guides the sheet to a position between the sheet discharging roller and the second passive roller.

2. The two-side scanning apparatus of claim 1, wherein the sheet guide plate pivots with a rotation of the sheet discharging roller train.

3. The two-side scanning apparatus of claim 1, wherein:
   the sheet discharging roller rotates in forward and reverse directions; and
   the first and second passive rollers are passively rotated by the sheet discharging roller.

4. The two-side scanning apparatus of claim 3, wherein when the sheet discharging roller rotates in the reverse direction, the sheet guide plate pivots into a predetermined position to guide the sheet positioned between the sheet discharging roller and the first passive roller to the sheet reversing path.

5. The two-side scanning apparatus of claim 1, further comprising:
a plurality of pinch rollers installed along the sheet reversing path to contact the circumferential surface of the white roller.

6. The two-side scanning apparatus of claim 5, wherein the plurality of pinch rollers include three pinch rollers installed along the sheet reversing path.

7. The two-side scanning apparatus of claim 1, further comprising:
a first sheet sensor installed between the sheet discharging roller train and the sheet guide plate to sense the sheet.

8. The two-side scanning apparatus of claim 7, further comprising:
a second sheet sensor installed between the sheet feeding roller and the white roller to sense the sheet.

9. A two-side scanning apparatus comprising:
a white roller installed on an image sensor;
a sheet transfer path extending from both sides of a contacting portion between the white roller and the image sensor;
a sheet feeding roller train installed on a first side of the white roller in the sheet transfer path to transfer a sheet to the white roller and comprising two rollers;
a sheet discharging roller train installed on a second side of the white roller in the sheet transfer path and comprising a sheet discharging roller, and first and second passive rollers installed on and beneath the sheet discharging roller to contact a circumferential surface of the sheet discharging roller;
a sheet reversing path surrounding a circumferential surface of the white roller to receive and guide the sheet that is transferred from the sheet discharging roller train back between the white roller and the image sensor;
a plurality of pinch rollers installed along the sheet reversing path to contact the circumferential surface of the white roller; and
a sheet guide plate installed in the single sheet transfer path between the white roller and the sheet discharging roller train to pivot at a predetermined angle, the sheet guide plate including an upper surface that guides the sheet to a position between the sheet discharging roller and the first passive roller and a lower surface that guides the sheet to a position between the sheet discharging roller and the second passive roller.

10. The two-side scanning apparatus of claim 9, wherein the sheet guide plate pivots with a rotation of the sheet discharging roller train.

11. The two-side scanning apparatus of claim 9, wherein:
the sheet discharging roller rotates in forward and reverse directions; and
the first and second passive rollers are passively rotated by the sheet discharging roller.

12. The two-side scanning apparatus of claim 11, wherein when the sheet discharging roller rotates in a reverse direction, the sheet guide plate pivots into a predetermined position to guide the sheet positioned between the sheet discharging roller and the first passive roller to the sheet reversing path.

13. The two-side scanning apparatus of claim 9, further comprising:
a first sheet sensor installed between the sheet discharging roller train and the sheet guide plate to sense the sheet.

14. The two-side scanning apparatus of claim 13, further comprising:
a second sheet sensor installed between the sheet feeding roller and the white roller to sense the sheet.

15. A scanning apparatus to scan two sides of a recording medium, comprising:
a frame, comprising:
a forward sheet path extending through a length of the frame; and
a reverse sheet path having a looped shape and connected to the forward sheet path at a first intersection and a second intersection;
a discharge unit having a discharge roller to rotate in a forward direction to discharge a sheet and to rotate in a reverse direction to transfer the sheet back to the reverse sheet path, the discharge unit including a first outlet port disposed above the discharge roller and a second outlet port disposed below the discharge roller; and
a sheet guide unit having a first state and a second state to guide a sheet that is being transferred in the forward direction to the second outlet port of the discharge unit and to guide a sheet that is being transferred in the reverse direction to the reverse sheet path when the sheet guide unit is in the first state, and to guide the sheet that is being transferred in the forward direction to the first outlet port of the discharge unit when the sheet guide unit is in the second state.

16. The apparatus of claim 15, wherein a sheet is transferred along the length of the forward sheet path past the first and second intersections in a forward direction, is transferred to the first intersection of the forward sheet path and the reverse sheet path in a reverse direction, is transferred around the looped shape of the reverse sheet path to the second intersection of the forward sheet path and the reverse sheet path in the reverse direction, and is transferred along the forward sheet path past the first intersection in the forward direction.

17. The apparatus of claim 15, further comprising:
a main roller disposed in the frame along the forward sheet path to form the reverse sheet path and to transfer a sheet along the forward sheet path and along the reverse sheet path; and
a sensor disposed opposite the main roller to scan a corresponding side of the sheet as the sheet is transferred along the forward sheet path by the main roller.

18. The apparatus of claim 17, further comprising:
a first position sensor disposed on a first side of the main roller to determine a position of the sheet when the sheet is transferred away from the main roller and the sensor; and
a second position sensor disposed on a second side of the main roller to determine a position of the sheet when the sheet is transferred toward the main roller and the sensor.

19. The apparatus of claim 17, further comprising:
a discharge roller rotatable in a forward direction and a reverse direction;
one or more position sensors to sense a position of the sheet; and
a controller to control the discharge roller to rotate in the forward and reverse directions according to the sensed position of the sheet.

20. The apparatus of claim 15, further comprising:
a sheet guide plate that is pivotable between first and second positions to guide a sheet between the white roller and the discharging unit in the reverse direction and in the forward direction.

21. The apparatus of claim 20, wherein the sheet guide plate has a first end that is closer to the discharging unit that is hinged and a second end that is closer to the white roller that is movable over a predetermined angle.

22. The apparatus of claim 15, wherein the reverse sheet path comprises a single continuous path.

23. A scanning apparatus to perform one-side scanning and two-side scanning operations, comprising:
   a frame having an input port, an output port, and a sheet path extending therebetween along a length of the frame;
   a sensor on a first side of the sheet path to scan a sheet;
   a discharge unit disposed at the output port of the frame and to transfer the sheet in one of a forward direction and a reverse direction; and
   a roller disposed on a second side of the sheet path opposite the sensor to transfer the sheet along the sheet path to the discharge unit, wherein the discharge unit transfers the sheet in the reverse direction around the roller away from the sheet path such that the sheet is guided over the sensor in an inverted state when the scanning apparatus performs the two side scanning operation.

24. The apparatus of claim 23, wherein an outer circumference of the roller opposite the sheet path forms a reverse path in the frame along which the sheet is reversed, and the reverse path includes an input intersection point directed into the reverse path adjacent to the discharge unit and an output intersection point directed in between the roller and the sensor.

25. The apparatus of claim 24, wherein the discharge unit comprises:
   a discharge roller that is rotatable in the forward direction and the reverse direction;
   a first output port disposed above the discharge roller;
   a second output port disposed below the discharge roller; and
   sheet directing plate disposed between the roller and the discharge unit to direct the sheet into the reverse path to scan a second side of the sheet and to direct the sheet to the first output port when performing the one-side scanning operation and the second output port when performing the two-side scanning operation.

26. The apparatus of claim 24, wherein the reverse path comprises a single continuous path.

27. The apparatus of claim 24, further comprising:
   one or more auxiliary rollers disposed along the reverse path to transfer the sheet back toward the forward direction.

28. The apparatus of claim 23, further comprising:
   a feeding unit to feed one or more sheets into the sheet path.

29. The apparatus of claim 23, further comprising:
   one or more position sensors disposed along the sheet path to sense a position of the sheet.

30. A method of controlling a two-side scanning apparatus, comprising:
   rotating a drive sheet feeding roller;
   scanning a rear side of a sheet transferred by the drive sheet feeding roller using an image sensor;
   rotating a sheet discharging roller;
   stopping the sheet discharging roller when the sheet has been transferred on an upper surface of a sheet guide plate of the two-side scanning apparatus and when a rear end of the sheet having the rear side thereof completely scanned, is positioned between the sheet discharging roller and a first passive roller;
   pivoting the sheet guide plate upward;
   rotating the sheet discharging roller in a reverse direction such that the sheet is guided along the upper surface of the sheet guide plate into a sheet reversing path; and
   scanning a front side of the sheet using the image sensor.

31. The method of claim 30, wherein when a first sheet sensor senses a front end of the sheet, the sheet discharging roller is rotated.

32. The method of claim 31, wherein when the first sheet sensor senses a rear end of the sheet, the sheet discharging roller is stopped from rotating.

33. A method of scanning two sides of a document, the method comprising:
   transferring the document between an image sensor and a main roller in a forward direction along a length of a frame of a scanning apparatus, where the document is guided along a guide plate; and
   stopping the transfer of the document once a first side of the document is scanned;
   transferring the document back through the frame around an outer circumference of the main roller and re-transferring the document between the image sensor and the main roller with the guide plate such that a second side of the document is scanned; and
   discharging the document.

* * * * *